United States Patent
Laffey (10) Patent No.: US 10,326,599 B2
(45) Date of Patent: Jun. 18, 2019

(54) RECOVERY AGENTS AND RECOVERY PLANS OVER NETWORKS

(71) Applicant: Hewlett Packard Enterprise Development LP, Houston, TX (US)

(72) Inventor: Thomas M. Laffey, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 139 days.

(21) Appl. No.: 15/149,870

(22) Filed: May 9, 2016

(65) Prior Publication Data

US 2017/0324562 A1 Nov. 9, 2017

(51) Int. Cl.
| | |
|---|---|
| *H04L 9/14* | (2006.01) |
| *H04L 9/30* | (2006.01) |
| *H04L 9/32* | (2006.01) |
| *G06F 11/14* | (2006.01) |
| *G06F 21/56* | (2013.01) |

(Continued)

(52) U.S. Cl.
CPC .......... *H04L 9/3247* (2013.01); *G06F 9/4416* (2013.01); *G06F 11/1464* (2013.01); *G06F 11/1469* (2013.01); *G06F 21/575* (2013.01); *H04L 9/14* (2013.01); *H04L 9/30* (2013.01); *H04L 41/0654* (2013.01); *H04L 63/0428* (2013.01); *H04L 63/06* (2013.01);
(Continued)

(58) Field of Classification Search
CPC ......... H04L 9/3247; H04L 9/14; H04L 63/08; H04L 63/0428; H04L 9/30; H04L 41/0654; G06F 11/1469; G06F 21/575; G06F 9/4416; G06F 11/1464; G06F 21/56; G06F 2221/032; G06F 2201/80
See application file for complete search history.

(56) References Cited

U.S. PATENT DOCUMENTS 5,960,170 A * 9/1999 Chen ..................... G06F 21/564
714/26
6,246,771 B1 * 6/2001 Stanton ................. H04L 9/0894
380/286

(Continued)

OTHER PUBLICATIONS

Dhilung Kirat et al., "Back to the Future: A Framework for Automatic Malware Removal and System Repair," ACSAC°11, Dec. 5-9, 2011, Orlando, Florida, USA, pp. 1-10, ACM.

(Continued)

*Primary Examiner* — Michael Pyzocha
(74) *Attorney, Agent, or Firm* — Hewlett Packard Enterprise Patent Department (57) ABSTRACT

Examples include sending and receiving recovery agents and recovery plans over networks. Some examples include receiving a recovery request over a network from a requestor, sending a response to the requestor over the network, sending an executable copy of a recovery agent with a validation measure to the requestor, establishing an encrypted connection with the requestor, receiving a second request from the requester over the encrypted connection, determining a recovery plan that includes a command executable by the recovery agent, and sending the recovery plan to the requester over the encrypted connection. In some examples, the recovery request includes data that identifies the requester and the response and the recovery plan are based on the data identifying the requester.

17 Claims, 7 Drawing Sheets

(51) Int. Cl.
*G06F 21/57* (2013.01)
*H04L 12/24* (2006.01)
*H04L 29/06* (2006.01)
*G06F 9/4401* (2018.01)

(52) U.S. Cl.
CPC .......... *G06F 21/56* (2013.01); *G06F 2201/80* (2013.01); *G06F 2221/032* (2013.01); *H04L 41/046* (2013.01)

(56) References Cited

U.S. PATENT DOCUMENTS

| | | | | |
|---|---|---|---|---|
| 6,347,375 | B1* | 2/2002 | Reinert | G06F 21/564 726/24 |
| 6,396,929 | B1* | 5/2002 | Chandersekaran | H04L 9/0894 380/286 |
| 6,842,523 | B1* | 1/2005 | Niwa | H04L 9/0894 380/278 |
| 7,756,834 | B2 | 7/2010 | Masters et al. | |
| 7,784,098 | B1 | 8/2010 | Fan et al. | |
| 7,941,850 | B1* | 5/2011 | Satish | G06F 21/554 726/22 |
| 8,107,945 | B2* | 1/2012 | Hoffner | H04W 24/04 455/418 |
| 9,087,199 | B2 | 7/2015 | Sallam | |
| 9,667,648 | B2* | 5/2017 | Teddy | H04L 63/145 |
| 2002/0052939 | A1* | 5/2002 | Lee | G06F 11/0748 709/223 |
| 2005/0235008 | A1* | 10/2005 | Camping | G06Q 10/087 |
| 2006/0088167 | A1* | 4/2006 | Bade | G06F 21/57 380/281 |
| 2007/0006304 | A1 | 1/2007 | Kramer et al. | |
| 2007/0118638 | A1* | 5/2007 | Ban | G05B 23/0272 709/224 |
| 2008/0104442 | A1* | 5/2008 | Diao | G06F 9/4401 714/3 |
| 2009/0075630 | A1* | 3/2009 | McLean | G06F 21/602 455/411 |
| 2009/0228991 | A1* | 9/2009 | Schneider | G06F 11/006 726/34 |
| 2011/0083004 | A1* | 4/2011 | Lipinski | G06F 11/0727 713/2 |
| 2011/0154491 | A1* | 6/2011 | Hernacki | G06F 21/568 726/23 |
| 2011/0293098 | A1* | 12/2011 | Fu | H04L 9/0894 380/286 |
| 2013/0326265 | A1* | 12/2013 | Garai | G06F 11/203 714/6.3 |
| 2015/0143454 | A1* | 5/2015 | Lee | H04L 63/0227 726/1 |
| 2015/0244522 | A1* | 8/2015 | Cheruvath | H04L 9/0894 713/183 |
| 2016/0212207 | A1* | 7/2016 | Guo | H04L 29/08 |
| 2017/0317824 | A1* | 11/2017 | Brown | H04L 9/0894 |
| 2017/0346694 | A1* | 11/2017 | Buendgen | H04L 41/0856 |

OTHER PUBLICATIONS

Regenscheid, Andrew, "BIOS Protection Guidelines for Servers", NIST Special Publication 800-147B, Aug. 2014, 32 pages.
Regenscheid et al., "BIOS Integrity Measurement Guidelines (Draft)", NIST Special Publication 800-155 (Draft), Dec. 2011, 47 pages.
Kovah et al., "New results for timing-based attestation", In Proceedings of the 2012 IEEE Symposium on Security and Privacy, 2012, pp. 239-253.
Cooper et aL, "BIOS Protection Guidelines", National Institute of Standards and Technology, Special Publication 800-147, Apr. 2011, 26 pages.
Butterworth et al., "BIOS Chronomancy: Fixing the Core Root of Trust for Measurement", CCS '13 Proceedings of the 2013 ACM SIGSAC conference on Computer & communications security, 2013, pp. 25-36.
"TCG PTS Schema web page" Jan. 9, 2011, available online at <https://trustedcomputinggroup.org/resource/tcg-attestation-pts-protocol-binding-to-tnc-if-m/>, 2 pages.
"TCG EFI Platform Specification", Version 1.20 Final, Revision 1.0, For TPM Family 1.2, Jun. 7, 2006, 37 pages.
"PTS Protocol: Binding to TNC IF-M", Specification Version 1.0, Revision 28, Aug. 24, 2011, 107 pages.
Hsu et al., "Back to the Future: A Framework for Automatic Malware Removal and System Repair", 22nd Annual Computer Security Applications Conference (ACSAC'06), Dec. 2006, 10 pages.

\* cited by examiner

RECOVERY AGENTS AND RECOVERY PLANS OVER NETWORKS

BACKGROUND

A computer network may include a variety of computing devices that are connected to each other by communication channels. The connection of the computing devices allows data generated at one computing device to be processed and transferred to other computing devices in the network. Each computing device in the network infrastructure plays a certain role in the network's operations. A network switch may help regulate data flow in the network by receiving data from a computing device in the network, processing the data, and then forwarding the data to computing devices in the network for which the data was intended.

BRIEF DESCRIPTION OF THE DRAWINGS

The following detailed description references the drawings, wherein.

DETAILED DESCRIPTION

A computing device (e.g., router, gateway, bridge, hub, switch, server, etc.) in a network may have machine-readable instructions on the device to help mandate the role the computing device plays in the network. In some examples, the machine-readable instructions may include booting code (machine-readable instructions that execute upon the powering or booting of a device) with multiple components. Upon powering (booting) of the computing device, the booting code may be executed directly from or may be loaded into the computing device's Random Access Memory (RAM) to be executed.

In some situations, the booting code is divided into separate portions, which may include the initial boot loader (IBL), the extended boot loader, and the operating system (OS) image. To protect the security of the device from malware attacks, these portions may be loaded in a certain order with later-loaded portions being verified by earlier-loaded portions before being executed.

In some situations, the IBL is the first portion of the booting code that is loaded. Because it is the first portion that is loaded, the IBL may be the most secure portion of the booting code and may be referred to as the core root of trust of the booting code. The IBL code may be stored in nonvolatile memory in an area that is protected from easy updates and access. For example, the IBL code may be stored in read only memory (ROM). Additionally, as another example, the area of memory where the IBL code is stored may be protected by hardware using a write once register, such as the flash itself having a write once register. In some examples, the write once register may be cleared on a power cycle.

The next portion of the booting code loaded is the extended boot loader. Before the extended boot loader is executed, the IBL verifies a digital signature in the code of the extended boot loader. A digital signature may be a file that is generated by an entity related to the development of the device (e.g., manufacturer of the computing device, etc.). In some examples, the digital signature is in the form of an encrypted hash.

The IBL includes a security key (e.g., a public key) that is also provided by the same entity that provides the digital signature (e.g., the manufacturer of the device, etc.). Using this security key, the IBL deciphers or decodes the encrypted hash. The IBL code also calculates a new hash of the extended boot loader. The IBL then compares the newly calculated hash to the encrypted hash to determine if there is a difference between the two hashes. The digital signature contained in the extended boot loader is verified when the calculated hash and the decoded hash are a match. After the IBL verifies the signature of the extended boot loader, the extended boot loader may be executed in RAM.

The same process is repeated for the operating system image before the operating system image is executed. The portion of code with the extended boot loader also includes a security key that may be used to validate a digital signature included with the image of the operating system. The areas of code that include the signature and the public keys may be characterized as roots of trust, with the extended boot loader having its own root of trust and the operating system image having its own root of trust. Thus, the booting of the computing device progresses from the core root of trust in the IBL, to the root of trust in the extended boot loader, to the root of trust in the operating system. In other words, the core root of trust in the initial boot loader is able to validate a digital signature in the root of trust of the extended boot loader before executing the extended boot loader, and the root of trust in the extended boot loader is able to validate the digital signature in the root of trust of the operating system image before executing it.

Because the extended boot loader and the operation system image are not protected by hardware, they may be easily corrupted in a malware attack. For example, if the digital signature in the root of trust of the extended boot loader is corrupted, the core root of trust of the initial boot loader cannot validate the signature of the extended boot loader and thus will not load the extended boot loader.

A network infrastructure may be vulnerable to malware attacks that are directed towards these types of machine-readable instructions (booting code). These attacks may come from easy access points in the network, such as the plug-and-play of socketable components and point-to-point connections (e.g., the connections between elements in a server stack, etc.). In some situations, these malware attacks may prevent a device in the network from performing its designated function in the network infrastructure, leading to network issues. Additionally, in some situations, the malware attack may be network-wide, infecting multiple devices in the network. In a network-wide malware infestation, it may be difficult for a device to recover to a safe state without physical user intervention as it may be easy for spoofing to occur.

Examples described herein address these issues by providing a way for the malware-affected device to identify a device in a network that may be trusted, and to connect to the identified device to receive a recovery agent from the identified device. Examples described herein also provide a way for the identified device to control the recovery of the malware-affected device using the recovery agent, thus allowing the malware-affected device to recover to a safe state. Thus, examples discussed herein allow the recovery process to be controlled by the identified device and thus sheltered from the malware on the malware-affected device.

In some examples, a computing device is provided with a non-transitory machine-readable storage medium. The non-transitory machine-readable storage medium includes instructions that are executable by a processing resource to receive a recovery request over a network from a requester with data identifying the requestor. The storage medium also includes instructions to send a response to the requester over the network based on the data identifying the requester, instructions to send an executable copy of a recovery agent with a validation measure to the requester, instructions to establish an encrypted connection with the requestor, instructions to receive a second request from the requester over the encrypted connection, instructions to determine a recovery plan based on the data identifying the requestor, and instructions to send the recovery plan to the requestor over the encrypted connection. The recovery plan may include a command that is executable by the recovery agent.

In some examples, a computing device is provided with a memory to store a security key and identity data of the computing device. The computing device also includes a first communication engine, a validation engine, an execution engine, and a second communication engine. The first communication engine is to broadcast a recovery request over a network, receive a response from a responder in the network, and receive an executable copy of a recovery agent with a validation measure from the responder. The recovery request comprises the identity data of the computing device. The validation engine is to determine a suitability of the recovery agent based on the security key and the validation measure. The execution engine is to execute the executable copy of the recovery agent, and the second communication engine is to establish an encrypted connection with the responder and to receive a recovery plan from the responder over the encrypted connection.

In some examples, a method is provided including determining an occurrence of a recovery event on a device, broadcasting a recovery request over a network, and receiving a response from at least one responder in the network. The recovery request includes data identifying the device. The method also includes receiving from each of the at least one responder an executable copy of a recovery agent with a validation measure, determining an appropriate responder, executing the executable copy of the recovery agent from the appropriate responder, establishing an encrypted connection with the appropriate responder, receiving a recovery plan from the appropriate responder over the encrypted connection, and executing the recovery plan with the recovery agent on the device. In some examples, the at least one responder includes at least two responders.

Figure 1:
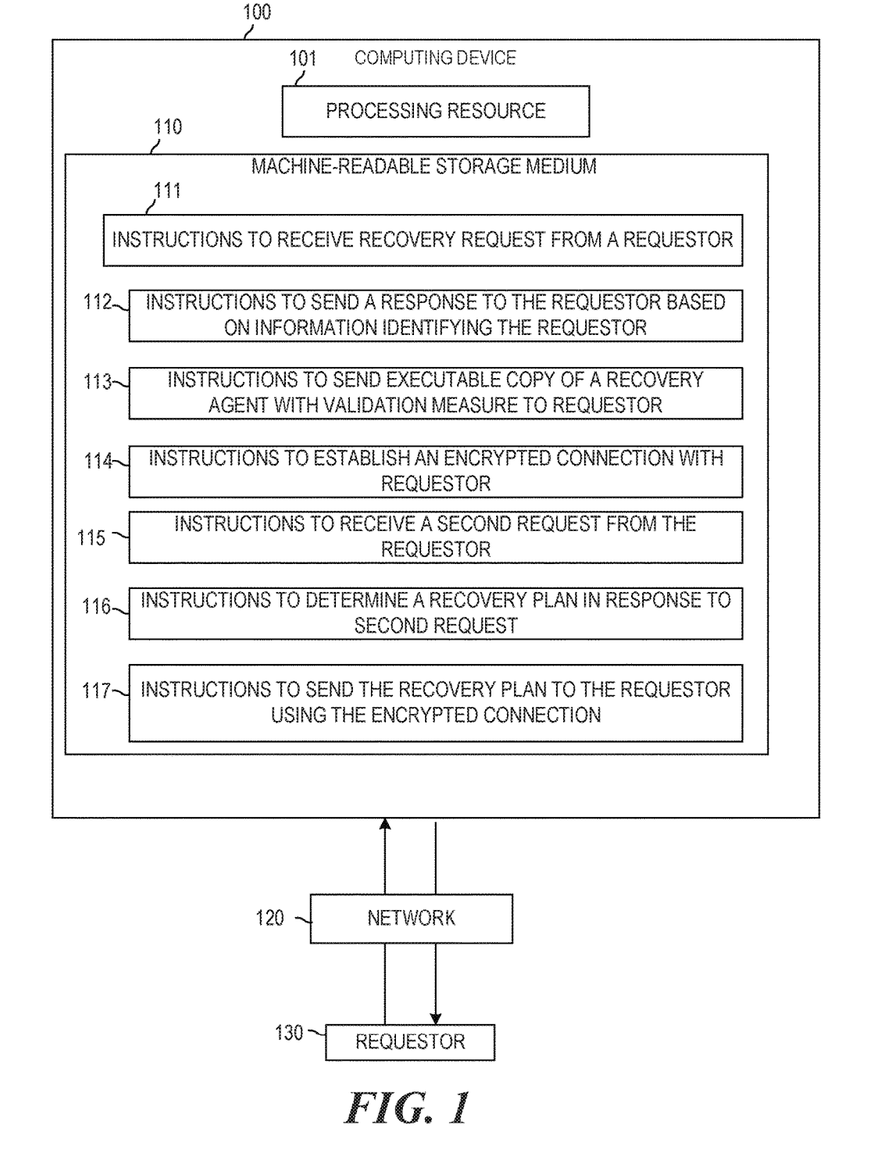
FIG. 1 is a block diagram of a computing device to determine a recovery plan to send to a requester, according to some examples.

Referring now to the figures, FIG. 1 is a block diagram of a computing device 100 to determine and send a recovery plan to a requestor. As used herein, a "computing device" may be a server, computer networking device, chip set, desktop computer, workstation, or any other processing device or equipment. In some examples, computing device 100 may be a server that interfaces with a remote network hardware, such as a switch.

Computing device 100 includes a processing resource 101 and a storage medium 110. Storage medium 110 may be in the form of non-transitory machine-readable storage medium, such as suitable electronic, magnetic, optical, or other physical storage apparatus to contain or store information such as instructions 111, 112, 113, 114, 115, 116, 117, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a nonvolatile memory where a copy of software or other data is stored.

In the example of FIG. 1, instructions 111, 112, 113, 114, 115, 116, and 117 are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to server 330 of FIG. 3. In other examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, 115, 116, and 117 as described herein.

Instructions 111 may be executable by processing resource 101 such that computing device 100 is operative to receive a recovery request from a requester 130 over a network 120. As used herein, a network may include a communication pathway between a first computing device and a second computing device made up of at least one intermediary computing device (e.g., nodes such as gateways, switches, etc.), at least one data linkage (e.g., electrical cable such as Ethernet, optical fibers, radio waves, etc.), or a combination thereof to allow the communication and exchange of data between the first and second computing device. Additionally, the pathway allows the communication and the exchange of data between the first computing device and any intermediary (if there are any) computing device in the pathway, and the communication and the exchange of data between the second computing device and any intermediary computing device in the pathway, if there are any. Thus, in the example of FIG. 1, network 120 is a pathway allowing computing device 100 to receive the recovery request (i.e. data) from requestor 130. In some examples, computing device 100 and requestor 130 are a part of (i.e., are nodes of) network 120. In some examples, the placement of computing device 100 and requestor 130 in the network infrastructure of network 120 is such that computing device 100 and requestor 130 are connected through many nodes and many data linkages. In other examples, the placement of computing device 100 and requestor 130 in the network infrastructure of network 120 is such that computing device 100 and requestor 130 are connected by one data linkage.

As used herein, a "recovery request" includes a message indicating to computing device 100 that requestor 130 is in need of a recovery service. Recovery request sent by requestor 130 may also include data identifying the requestor. In some examples, the data identifying the requestor may include the manufacturer or vendor of the requestor, the functionality of the requestor, etc.

Different types of communication protocols may be used for the recovery request, including, but not limited to, Dynamic Host Configuration Protocol (DHCP). In some examples with DHCP, options may be utilized and included in the recovery request, including options that may be used to convey the data identifying the requestor. Thus, the recovery request may be a DHCPDiscover message with an option sent by requestor 130. Instructions 111 are executable by processing resource 101 to receive the DHCPDiscover with the option.

Instructions 112 are executable by processing resource 101 to send a response to requestor 130. Instructions 112 may include instructions to recognize the recovery request as a recovery request. For example, in examples using DHCP as described above, instructions 112 may include instructions to recognize an option specified in DHCPDiscover as a recovery service request, rather than a request for an IP address.

Additionally, the response sent is based, at least in part, on the data identifying the requestor that is in the recovery request. In other words, instructions 112 may include instructions to recognize from the data identifying the requestor that the device requesting recovery service is a device that computing device 100 has the ability to service (i.e., was configured to service).

For example, when DHCP is used as the protocol, the DHCPDiscover message may include an option (e.g., a specific vendor class option, etc.) that identifies requestor 130 to computing device 100 as a specific requestor. Instructions 112 recognizes the option as indicating that requestor 130 is a requestor that computing device 100 is able to service and sends a response to the requestor 130. In examples where DHCP is used, the response sent is in the form of a DHCPOffer.

Computing device 100 also includes instructions 113 that are executable by processing resource 101 to send an executable copy of a recovery agent with a validation measure to the requestor 130 over network 120. In some examples, the executable copy of the recovery agent that is sent is based on the data identifying the requestor. Thus, in some examples, instructions 113 also include instructions to determine an appropriate recovery agent based on the data identifying the requestor and send an executable copy of the appropriate recovery agent. This is because, in some examples, computing device 100 may store different types of recovery agents for different types and instances of requestors. This is described in the example of FIG. 3 in relation to memory 336 and recovery agent engine 333.

In some examples, where DHCP is used as the communication protocol, instructions 113 are executable in response to a DHCPRequest from the requestor. In the DHCPRequest, the requestor 130 asks the computing device 100 to send an executable copy of the recovery agent that it has.

As used herein, a recovery agent includes any mechanism, including suitable software agent, computer program, or the like that may execute a received command within the confines of the permissions of the initial loaders (e.g., initial boot loader, extended boot loader, etc.) of the requestor for which it is to recover. In other words, the recovery agent has the same access to memory and filesystem of the requestor as the permissions provided to the initial loaders. Thus, in some examples, the recovery agent has the same access as the initial boot loader. In other examples, the recovery agent has the same access as the extended boot loader.

As used herein, a validation measure includes data sent with the executable copy of the recovery agent that may be used by requestor 130 to verify the integrity of the executable copy of the recovery agent. The requestor 130 may use the validation measure to ensure that the recovery agent has not been tampered with and that computing device 100 may be trusted. In some examples, the validation measure may be a file signature that is an encrypted hash. In some examples, the file signature may be provided by the manufacturer of requestor 130. In some examples, the validation measure may be used along with a security key provided on the requestor 130 to verify the integrity of the executable copy of the recovery agent.

Computing device 100 includes instructions 114 that are executable by processing resource 101 to establish an encrypted connection with requestor 130. Different types of protocols may be used to establish an encrypted connection, including, but not limited to, Secure Sockets Layered (SSL), Transport Layer Security (TLS), Internet Protocol Security (IPsec), etc. In these connections, computing device 100 and requestor 130 take steps to establish privacy before the data exchange.

For example, with TLS, computing device 100 and requestor 130 may exchange and negotiate cipher suites (ciphers and hash functions) to be used to encrypt data that is exchanged. Thus, in examples using TLS, instructions 114 may include instructions to pick a cipher and a hash function from a list of cipher and hash functions that are provided by requester 130.

In some examples, instructions 114 may also include instructions to authenticate the requestor 130. For example, in a TLS protocol, instructions 114 may include instructions to send a CertificateRequest message to requester 130 (to ask for the requestor's certificate). Instructions 114 may also include instructions to receive the requesters certificate. The requestor's certificate may include information that identifies the requestor (e.g., what role the requester plays in the network or the instance of the requestor). Additionally, instructions 114 may include instructions to validate the Certificate received by computing device 100 using the TLS protocol. In some examples, a recovery plan may be determined based, at least in part, on this authentication and the information in the requester's certificate.

In some examples, instructions 114 may also include instructions for computing device 100 to authenticate itself to the requester 130. For examples where TLS is used, this may include instructions to send to the requester 130 a Certificate message, which may be authenticated by using a second security key stored by computing requester 130.

Figure 2:
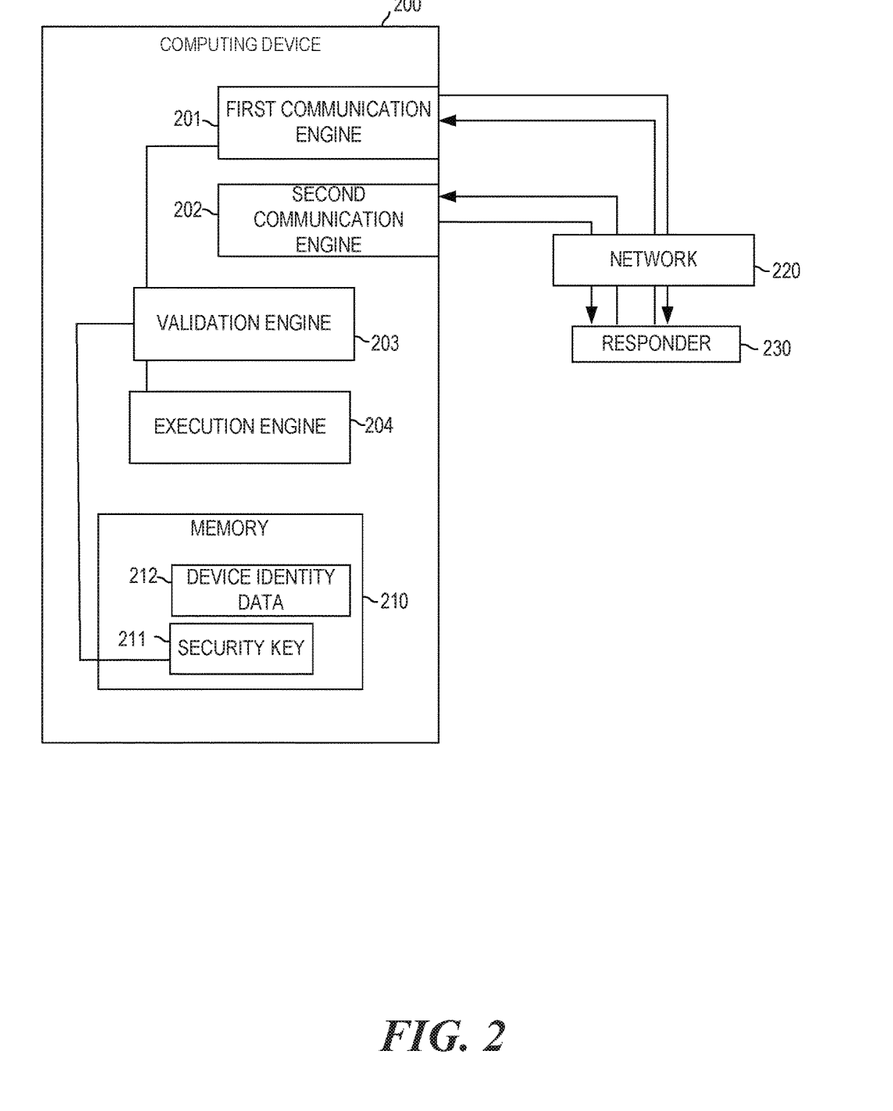
FIG. 2 is a block diagram of a computing device to receive a recovery plan from a responder, according to some examples.
Figure 3:
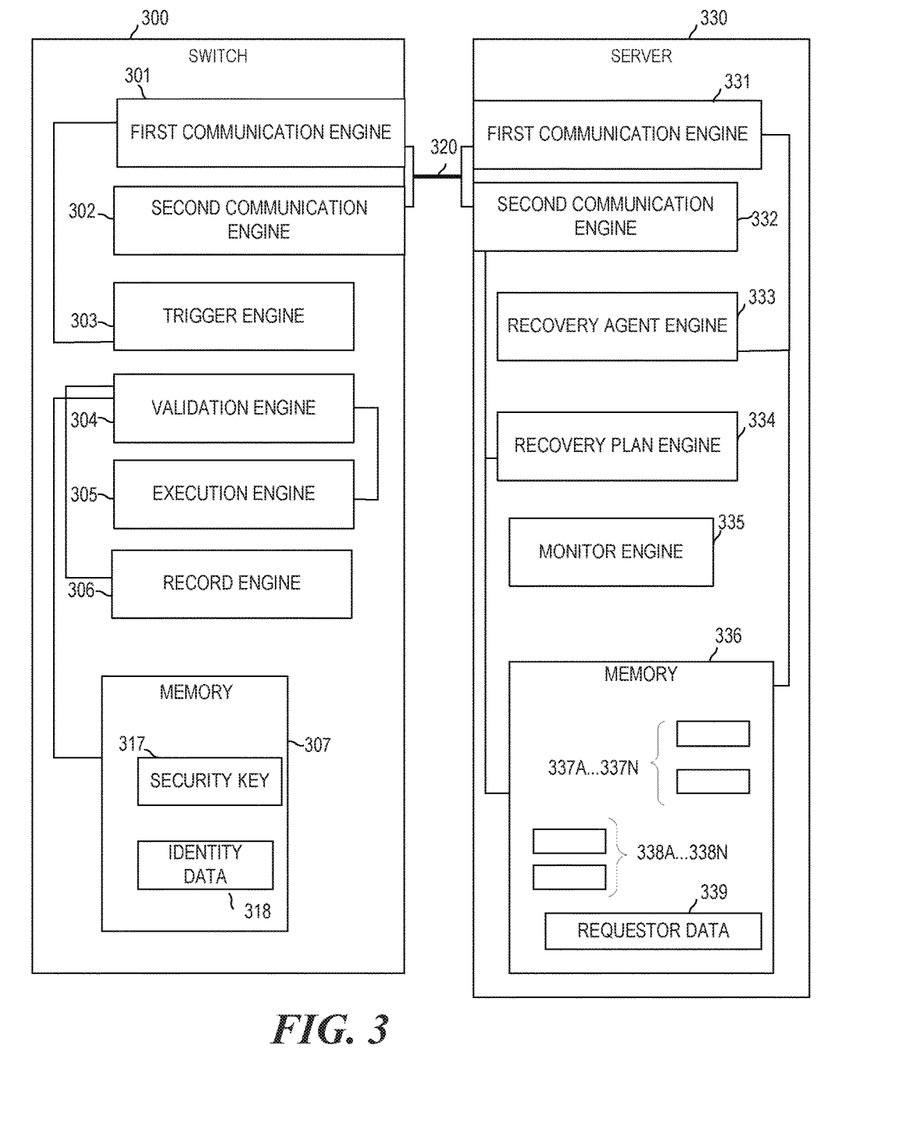
FIG. 3 is a block diagram of a switch and a server interfacing with one another, according to some examples.

The second security key stored by requester 130 is different from the security key stored by computing device 200 of FIG. 2 and switch 300 of FIG. 3. While both security keys may be public keys, they may be issued by different entities. For example, the second security key used to authenticate computing device 100 may be issued by the user of computing device 100 and requester 130 while the security key as discussed in FIGS. 2 and 3 may be issued by the manufacturer of the hardware of computing device 200 and switch 300. Additionally, the second security key may be stored in a different portion of memory of requester 130 than the security key as discussed in FIGS. 2 and 3. For example, the security keys in FIGS. 2 and 3 may be stored in portions of memory that are hard to alter while the second security key may be stored in portions of memory that are easy to alter, relative to the security keys of FIGS. 2 and 3. In some examples, and as discussed below, the second security key that may be used to authenticate computing device 100 is missing or corrupted. In those examples, a recovery plan sent by computing device 100 may include the installation of a new security key to replace the second security key.

While the example of FIG. 1 includes instructions 114 to establish an encrypted connection, in other examples, instructions 114 may be executable by processing resource 101 to establish an authenticated but not encrypted connection with requestor 130 (where computing device 100 is authenticated to requestor 130, requestor 130 is authenticated to computing device 100, or both).

Instructions 115 may be executable by processing resource 101 to receive a second request from requestor 130. The second request from requestor 130 may include a request to receive a recovery plan from computing device 100.

Instructions 116 may be executable by processing resource 101 to determine a recovery plan for requestor 160 in response to the second request. The recovery plan may be determined based, at least in part on, the data identifying requestor 130 that was received with the recovery request. Additionally, the recovery plan may be determined based, at least in part on, the authentication of requestor 130 to computing device 100. In some examples, computing device 100 does not include instructions 115. In those examples, instructions 116 may be executable to determine a recovery plan for requestor 160 in response to the establishment of the encrypted connection with instructions 114.

As used herein, a recovery plan may include commands that are executable by the recovery agent on the requestor and any files or data that may be used by the recovery agent to bring the requestor 130 back to a safe operating state. Additionally, a recovery plan may also include configuration data that is associated with the requestor. In some examples, like in the example shown in FIG. 3, computing device 100 may store information for each type and each instance of requestor that it is configured to service, including files needed for each requestor, configuration data for each requestor, etc.

In some examples, instructions 114 may include instructions for computing device 100 to authenticate itself to requestor 130 but requestor 130 may not have the second security key to do so (because second security key is missing or corrupted). In those examples, the recovery plan determined by instructions 116 may include the installation of a security key to replace the second security key.

Instructions 117 are executable by processing resource 101 to send the recovery plan to requestor 130 using the encrypted connection.

In some examples, instructions 116 include instructions to receive a recovery plan response from requestor 130 over the encrypted connection and instructions to determine a second recovery plan based, at least in part, on the recovery plan response. In these examples, instructions 117 include instructions to send the second recovery plan to the requestor using the encrypted connection. Instructions 116 and 117 allow computing device 100 to control the recovery process of requestor 130 through the recovery agent.

It is appreciated that computing device 100 of FIG. 1, which is described in terms of processors and machine-readable storage mediums, can include one or more structural or functional aspects of computing device 330 of FIG. 3, which is described in terms of functional engines containing hardware and software.

FIG. 2 is a block diagram of a computing device 200 to receive a recovery agent and a recovery plan over a network, according to some examples. Computing device 200, like computing device 100, may be a server, computer networking device, chip set, desktop computer, workstation, or any other processing device or equipment. In some examples, computing device 200 may be a computer networking device (e.g., a switch) that interfaces with a remote server. Computing device 200 includes first communication engine 201, second communication engine 202, validation engine 203, and execution engine 204. Each of these aspects of computing device 200 will be described below. It is appreciated that other engines can be added to computing device 200 for additional or alternative functionality. Engines 201, 202, 203, and 204 may interface with memory 210. Memory 210 may be a machine-readable storage medium of computing device that is protected by hardware. In some examples, memory 210 may be implemented by Read-Only Memory (ROM) and immutable. In some examples, memory 210 may be implemented by flash (e.g., electrically erasable programmable read-only memory, EEPROM), or a combination thereof.

Each of engines 201, 202, 203, and 204, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, system 200 may include additional engines.

Each engine of computing device 200 can include at least one machine-readable storage mediums (for example, more than one) and at least one computer processor (for example, more than one). For example, software that provides the functionality of engines on computing device 200 can be stored on a memory of a computer to be executed by a processor of the computer. In some examples, software that provides the functionalities of engines 201, 202, 203, and 204, are also stored in memory 210. This is to protect these engines and the functionalities of these engines.

First communication engine 201 is an engine of computing device 200 that includes a combination of hardware and software that allows computing device 200 to send a recovery request over a network 220 to a responder 230. In some examples, the recovery request is broadcasted over the network. In some examples, the recovery request sent by computing device 200 may include identity data 212 stored in memory 210. Identity data 212 is information identifying a characteristic of computing device 200 (e.g., what device 200 is, where it is located in the network infrastructure, the functions of device 200, etc.) In some examples, identity data 212 may be the identity information provided in the TLS certificate of computing device 200.

First communication engine 201 also allows computing device 200 to receive a response from responder 230, and to receive an executable copy of a recovery agent with a validation measure from the responder 230 over network 230. The discussion of "recovery request", "validation measure", "network", and "recovery agent" above in relation to FIG. 1 also apply here.

In some examples, first communication engine 201 may be implemented with DHCP. In these examples, the recovery request sent by first communication engine 201 is a DHCP-Discover message and the response received by first communication engine 201 a DHCPOffer message. In examples where DHCP is used, first communication engine 201 also allows computing device to send a DHCPRequest to responder 230 in response to the DHCPOffer. In some examples, the DHCPRequest is a unicast request to responder 230 asking responder 230 to send its executable copy of a recovery agent with a validation measure.

Validation engine 203 is an engine of computing device 200 that includes a combination of hardware and software that allows computing device 200 to determine a suitability of the recovery agent that is received from responder 230. Validation engine 203 interacts with memory 210 of computing device 200. Memory 210 stores a security key 211 that may be used by validation engine 203 to determine a suitability of the executable copy of the recovery agent received from responder 230.

Security key 211 provides a way to evaluate the validation measure sent with the executable copy of the recovery agent. Engine 203 compares security key 211 with the validation measure. A match between the security key 211 and validation measure indicates that the executable copy of the recovery agent is suitable (e.g., has not been tampered with).

As discussed above, in some examples, the validation measure may be an encrypted hash created with an entity's private key (e.g., the manufacturer of computing device 200). In these examples, to determine a suitability of the executable copy of the recovery agent, validation engine 203 calculates a hash of the executable copy of the recovery agent. Validation engine 203 uses security key 210 to decode the encrypted hash. In some examples, security key 210 may be a public key provided by the same entity (e.g., the manufacturer of computing device 200). Validation engine 203 compares the decoded hash and to the calculated hash to determine the suitability of the recovery agent. A match between the decoded hash and the calculated hash indicates that the recovery agent is suitable (e.g., the code of the recovery agent has not been tampered with) and that the responder 230 may be viewed as a trusted responder.

Execution engine 204 is an engine of computing device 200 that includes a combination of hardware and software that allows computing device 200 to execute the executable copy of the recovery agent from responder 230. In some examples, validation engine 203 initializes execution engine 204 to execute the executable copy of the recovery agent when it determines that the executable copy of the recovery agent is suitable.

Second communication engine 202 is an engine of computing device 200 that includes a combination of hardware and software that allows computing device 200 to establish an encrypted connection 212 with responder 230 over network 220. As discussed above, the encrypted connection may be established using TLS. In examples using TLS, second communication engine 202 allows computing device 200 to send a message to responder 230 indicating that it would like to establish a TLS connection. In establishing an encrypted connection using TLS, second communication engine 202 may also allow computing device 200 to send to responder 230 a list of cipher and hashes for responder 230 to choose from to use when exchanging data over the encrypted connection.

As discussed above, in some examples, responder 230 may ask computing device 200 to authenticate itself. Second communication engine 202 may allow computing device 200 to do so. In examples where TLS is used, an authentication request from responder 230 may be in the form of a CertificateRequest message from responder. Second communication engine 202 may allow computing device 200 to authenticate itself by sending (to responder 230) computing device 200's Certificate in response to the CertificateRequest message. As discussed above, in relation to FIG. 1, the recovery plan determined by responder 230 may be based, at least in part, on the information in the certificate.

As discussed above, in some examples, responder 230 may authenticate itself to computing device 200. Second communication engine 202 may allow computing device 200 to receive the data that allows computing device 200 to authenticate the responder 230.

In examples where TLS is used, the data received by responder 230 to authenticate responder 230 is the responder's certificate. Second communication engine 202 may allow computing device 200 to receive this certificate. Computing device 200 may then authenticate the certificate by using a second security key stored in computing device 200. It is appreciated that the second security key is different from security key 211 and the discussion of the second security key stored in responder 130 in relation to FIG. 1 is applicable here. For example, the second security key may be issued by the user (e.g., an enterprise operating a data center, etc.) of responder 230 rather than the manufacturer of the computing device 200.

Second communication engine 202 may allow recovery agent to send a second request to responder 230 over the encrypted connection. As discussed above in relation to FIG. 1, the second request may include a request sent by the recovery agent for a recovery plan from responder 230. In some examples, a second request is not sent to responder 230. In those examples, the establishment of the encrypted connection initiates responder 230 to determine a recovery plan.

Figure 6:
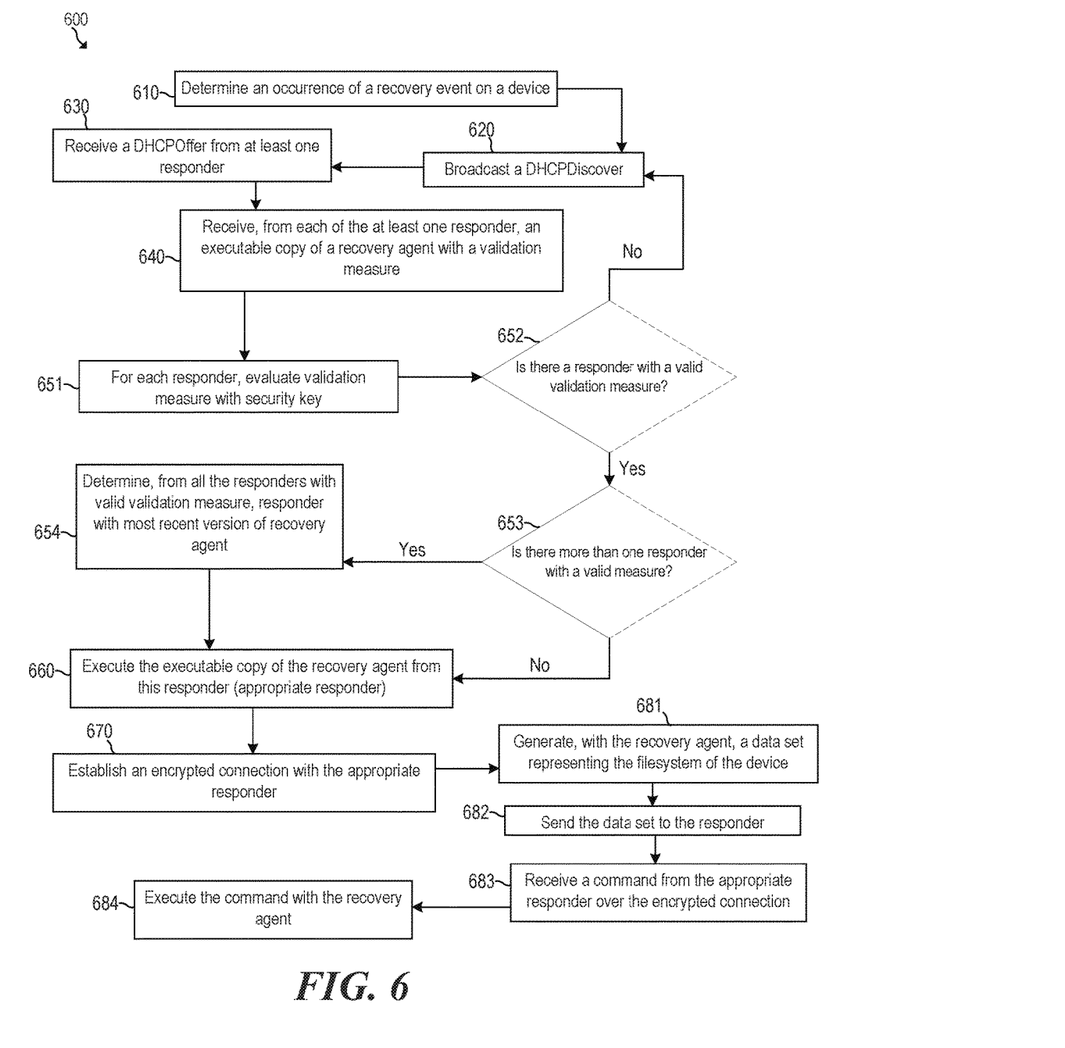
FIG. 6 is a flowchart of a method of determining an appropriate responder from which to execute a recovery agent, according to some examples.

Additionally, second communication engine 202 may allow computing device 200 to receive the recovery plan from responder 230 over the encrypted connection. Second communication engine 202 may be used for communication between computing device 200 and responder 230, including the exchange of the data set representing the filesystem of computing device 200, as discussed in relation to 681 and 682 in method 600. As discussed below, this may allow responder 230 to obtain forensic data of computing device 200 before computing device 200 is recovered to a safe state.

Second communication engine 202 may also allow further communication between the recovery agent (executed on computing device 200) and responder 230 over the encrypted connection.

While second communication engine 202 in example of FIG. 2 allows computing device 200 to establish an encrypted connection with responder 230, in other examples, second communication engine 202 may instead allow computing device 200 to establish an authenticated but not encrypted connection with responder 230 (where the computing device 200 is authenticated to the responder 230, responder 230 is authenticated to computing device 200, or both).

FIG. 3 shows a block diagram of a switch 300 interacting with a server 330 to recover switch 300 to a safe state. Although FIG. 3 shows the specific example of a switch and a server, it is appreciated any two computing devices that interact in a network could implement the functionalities described below.

Switch 300 includes first communication engine 301, second communication engine 302, validation engine 304, and execution engine 305. First communication engine 301 has similar functionalities as communication engine 201, second communication engine 302 has similar functionalities as communication engine 202, validation engine 304 has similar functionalities as validation engine 204, and execution engine 305 has similar functionalities as execution engine 205.

Switch 300 also includes trigger engine 303 and record engine 306.

Record engine 306 is a functional engine of switch 300 that includes a combination of hardware and software that allows switch 300 to store the suitability determination by validation engine 304. Thus, record engine 306 may include a machine readable storage medium that may be easily accessed and updated. Record engine 306 allows switch 300 to retain the suitability determination of recovery agent received from server 330. This may be useful in examples where the first recovery request broadcast does not result in finding a recovery agent to execute. For example, if validation engine 304 determined that the executable copy of the recovery agent received from server 330 was not suitable (e.g., its validation measure is not valid), then that determination could be stored by record engine 306. When switch re-broadcasts a recovery request, switch 300 would not need to repeat the suitability determination for server 330.

In some examples, record engine 306 stores the suitability determination for a specific amount of time (e.g., for ten minutes, five minutes, three minutes, etc.) before the erasing the suitability determination. This may be useful in a network where servers may go online and go offline (i.e., disconnected from the network) intermittently in a network.

Trigger engine 303 is a functional engine of switch 300 that includes a combination of hardware and software that allows switch 300 to determine an occurrence of a recovery event and initialize first communication engine 301 to broadcast a recovery request. In some examples, a recovery event may be the failure of switch 300 to load initial loaders (e.g., the initial boot loader, the extended boot loader, etc.) In some examples, a recovery event may be the failure of booting sequence to go through its signature validation (i.e. moving through the different roots of trust). This may occur when the core root of trust (the root of trust of the initial boot loader) fails to validate the signature of the extended boot loader, or when extended boot loader fails to validate the signature of the operating software. In some examples, a recovery event may be a boot command inputted by a user input. Upon a determination of an occurrence of a recovery event, trigger engine 303 initializes first communication engine 301 to broadcast a recovery request.

In the example of FIG. 3, switch 300 is connected to server 330 through network 320. The discussion above in relation to network 120 in FIG. 1 is applicable to network 320. Server 330 may include a first communication engine 331, a second communication engine 332, a recovery agent engine 333, a recovery plan engine 334, and a monitor engine 335. Server 330, which is descried in terms functional engines containing hardware and software, can include one or more structural or functional aspects of computing device 100 of FIG. 1, which is described in terms of processors and machine-readable storage mediums.

First communication engine 331 is a functional engine of server 330 that includes a combination of hardware and software that allows server 330 to receive a recovery request broadcasted from first communication engine 301 of switch 300.

Recovery agent engine 333 is a functional engine of server 330 that includes a combination of hardware and software that allows server 330 to recognize the recovery request message received from switch 300 as a recovery request. As discussed above in relation to instructions 111 of FIG. 1, the recovery request may include data to indicate that the message is a recovery request and data identifying switch 300. In some examples, the broadcast from switch 300 may be in the form of a DHCPRequest with specific options (e.g., user options, vendor-class options, etc.). Recovery agent engine 333 may recognize an option in the DHCPRequest and determine that the DHCPRequest is a recovery service when a specific option is present.

Additionally, as discussed above in relation to first communication engine 201, and first communication engine 301, recovery request may include data identifying switch 300. In some examples, this information may be included as an option in the DHCPRequest message. Recovery agent engine 311 may recognize this option in the DHCPRequest message and determine that the switch is a particular model (e.g., a model number) due to the presence of this option in the DHCPRequest.

Server 330 may include a memory 336 to store a requestor data 339 and copies of recovery agents 337A-337N, each copy of a recovery agent with its own validation measure. Requestor data 339 may include a list of possible requestors (i.e., switches in the network) associated to an appropriate recovery agent. For example, requestor data 339 may include the identifying information of switch 300 and associate that identifying information to a specific recovery agent configured to recover switch 300.

Recovery agent engine 333 may interface with requester data 339 in memory 336 to determine if server 330 may service switch 300 (e.g., if identifying information of switch 300 is included in requestor data 339, then server 300 may service switch 300) and to determine which specific recovery agent to use with switch 300.

First communication engine 331 allows server 330 to send a response to switch 300 over network 320 when recovery agent engine 333 determines that server 330 may service switch 300. First communication engine 331 may be implemented using DHCP. In these examples, the response may be in the form of a DHCPOffer message.

First communication engine 331 also allows server 330 to send an executable copy of a recovery agent with a validation measure. In examples where first communication engine 301 and first communication engine 331 are implemented by DHCP, first communication engine 303 of switch 300 sends a DHCPRequest message to first communication engine 333 of server 330 in response to the DHCPOffer message. The receipt of this DHCPRequest causes first communication engine 331 of server 330 to send an executable copy of a recovery agent with a validation measure. The recovery agent that is sent is the specific one determined to be appropriate by recovery agent engine 333, as discussed above.

Second communication engine 332 is a functional engine of server 330 that allows server to establish an encrypted connection with switch 300 over network 320. The discussion of encrypted connection in relation to FIG. 1 is applicable here. In some examples, second communication engine may use TLS. In those examples, second communication engine 332 allows server 330 to negotiate with second communication engine 302 of switch 300 the details of the encrypted connection, including but not limited to the encryption process and cryptographic keys to use. In some examples, as part of the establishment of the encrypted connection, second communication engine 332 may also allow server 330 to request switch 300 authenticate itself to server 330. In examples using TLS, this may be done by second communication engine 332 sending switch 300 a CertificateRequest message. In those examples, second communication engine 332 may authenticate the identity of switch 300 using TLS and the certificate sent by switch 300.

Additionally, in some examples, as part of the establishment of the encrypted connection, second communication engine 332 may also allow server 330 to send a certificate to switch 300 to authenticate server 330.

While second communication engine 332 in example of FIG. 3 allows server 330 to establish an encrypted connection with switch 300, in other examples, second communication engine 332 may instead allow server 330 to establish an authenticated but not encrypted connection with switch 300 (where switch 300 is authenticated to server 330, server 330 is authenticated to switch 300, or both).

As discussed above, second communication engine 303 may send a second request to server 330 to request a recovery plan over the encrypted connection. Second communication engine 332 allows server 330 to receive the second request from second communication engine 302 of switch 300 over the encrypted connection.

Recovery plan engine 334 is a functional engine of server 330 that allows server to determine a recovery plan for switch 300 in response to the second communication engine 332 receiving the second request from second communication engine 302. In some examples, recovery plan engine 334 may determine a recovery plan in response to the establishment of the encrypted connection with switch 300 without the receipt of the second request from switch 300.

The recovery plan engine 334 determines a recovery plan based, at least in part, on the recovery request broadcast that is received by first communication engine 331 and the data identifying switch 300. Recovery plan engine 334 may also determine a recovery plan based, at least in part, on the data used to authenticate switch 300. In some examples, the data identifying switch 300 may provide different information about switch 300 than the certificate that is used to authenticate switch 300. For example, the data identifying switch 300 may describe the model number of the switch, while the information in the certificate used to authenticate the switch may describe the role the switch plays in the network (e.g., its MAC address, etc.). As discussed above, in some examples, the data provided in the recovery request may include the same information that is in the TLS certificate.

As discussed above in relation to recovery agent engine 333, server 330 may include memory 336. In addition to copies of recovery agents 337A-337N, memory 336 may also store other files, configuration data, machine-readable code, etc. 338A-338N that may be used in the recovery of switch 300. Requester data 339 may associate a particular requestor to these other files, configuration data, etc. 338A-338N.

Recovery plan engine 334 may interact with requestor data 339 to determine files, configurations, etc. 338A-338N to send to switch 300 in the recovery plan. For example, recovery plan engine 334 may determine that a WRITE command for a specific file is needed because on a switch 300 that is not misbehaving (e.g., infected by malware), the filesystem of switch 300 would include that file. Thus, the recovery plan determined by recovery plan engine 334 would include the command and the specific file. In some examples, the identity data of the switch (sent in the recovery request) may indicate that one set of files, configuration data, etc. are needed and the information in the TLS certificate may indicate that an additional set of files are needed. The recovery plan would include both sets.

Some non-limiting examples of items in a recovery plan may be a host key creation, creation of certificate signing requests, etc. In yet another example where TLS is used, a recovery plan may include the installation of a new second security key that may be used by switch 300 to authenticate the certificate sent by server 330. In these examples, switch 300 may not have the second security key that may be used to do so (e.g., the second security key was infected by the malware attack on switch 300).

Second communication engine 332 allows server 330 to send the recovery plan determined by recovery plan engine 334 over the encrypted connection. The commands that are issued by recovery plan engine 334 are executable by the recovery agent on switch 300.

The recovery agent that is executed on switch 300 executes the recovery plan. In some examples, recovery agent may execute the recovery plan and send back responses to what happened after the recovery plan was executed. For example, the recovery plan may include a WRITE command for a certain file. The recovery agent that is running on the switch 300 executes this command and sends a command response back to server 330 using second communication engine 302 and second communication engine 332. In some examples, a response may describe what occurred after the command was executed. The recovery plan engine 334 allows server 330 to determine a second recovery plan, based in part, on the response to the first recovery plan. The second communication engine then allows server 330 to send the second recovery plan to switch 300.

In some examples, and in the example of FIG. 3, server 330 includes a monitor engine 335. Monitor engine 335 is a functional engine of server 330 that allows server 330 to monitor the network and the behavior of switch 300. Monitor engine 335 also allows server 330 to issue a command to switch 300 to begin a recovery process when it determines that switch 300 is misbehaving (e.g., if switch 300 begins to perform web-browsing functions). It can then command the switch 300 to start the recovery process (i.e. broadcast a recovery request through first communication engine 301). In some examples, monitor engine 335 may be a software defined network (SDN) controller application.

Figure 4:
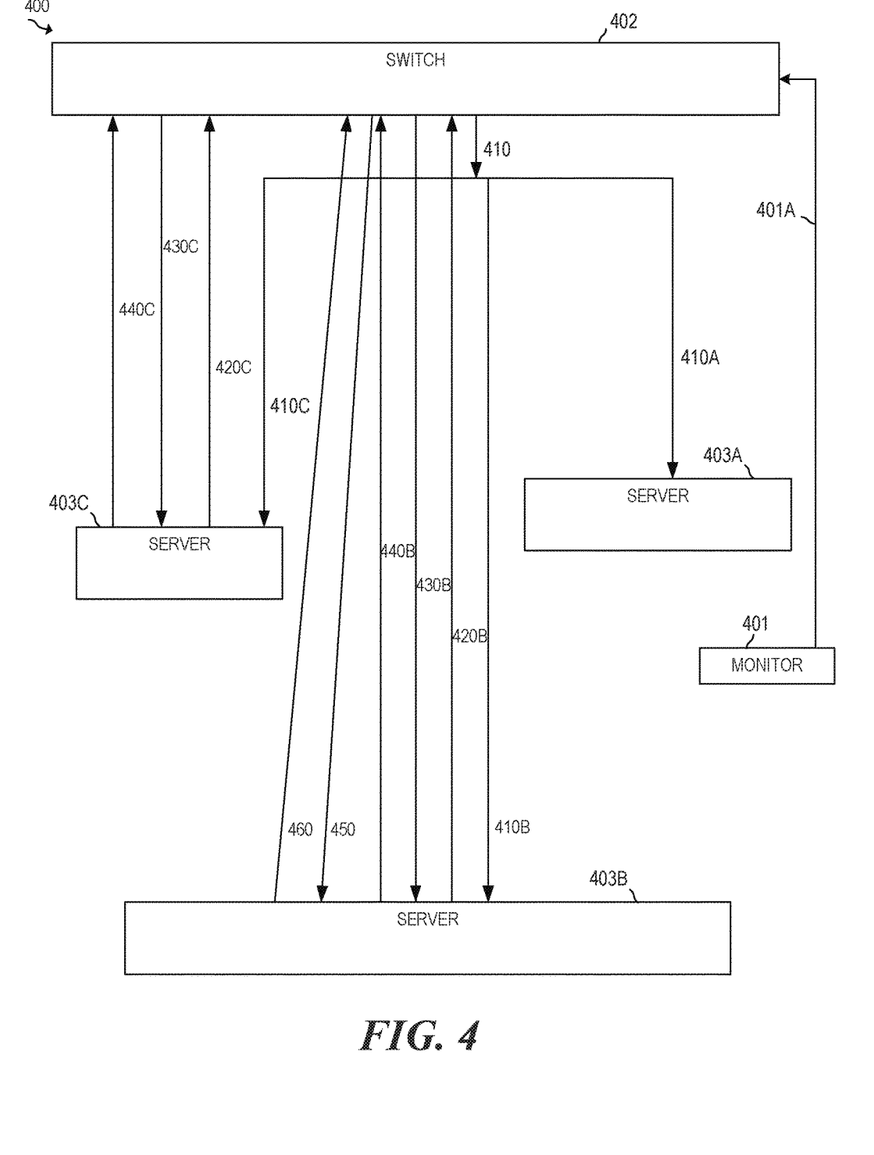
FIG. 4 is a block diagram of a network including a monitor, a switch, and a variety of servers, according to some examples.

FIG. 4 shows a block diagram of the communications between a monitor, switch, and servers in network 400 to recover a malfunctioning switch. Network 400 includes switch 402; servers 403A, 403B, and 403C; and monitor 401. While FIG. 4 shows specific types of computing devices, network 400 may include additional computing devices not shown (e.g. gateways, etc.) Network 400 may also include more or less computing devices than shown.

Network 400 includes monitoring computing device 401. In some examples, monitoring computing device is a server. Monitoring computing device may include a monitor engine with similar functionalities to monitor engine 335 as described in relation to FIG. 3. Thus, monitoring computing device monitors the data flow in network 400 for unexpected data traffic. If monitoring computing device determines that switch 402 is displaying behavior not aligned with its designated role in network 400, it sends a signal 401A telling switch 402 to initiate recovery.

Switch 402 is a computing device. Switch 402 may include the engines as described in relation to computing device 200 in FIG. 2 or the engines as described in relation to switch 300 in FIG. 3. Switch 402 broadcasts a recovery request 410 over network 400. The request is received at server 403A, server 403B, and 403C as recovery requests 410A, 410B, and 4100, respectively. In examples using DHCP, the broadcast recovery request may be a DHCPDiscover message.

The broadcast of recovery request 410 may be due to signal 401A from monitor 401. Additionally, the broadcast of recovery request 410 may occur if switch 402 determines the occurrence of a recovery event. The discussion in relation to trigger engine 303 and the types of recovery events in FIG. 3 is applicable here. In some examples, and as described above, the broadcast recovery request may include data that identifies switch 402. In some examples using DHCP, the DHCPDiscover message may include options to identify switch 402 to servers 403A, 403B, and 403C.

Server 403A receives the recovery request broadcasted 410 as recovery request 410A, server 403B receives broadcasted recovery request 410 as recovery request 410B, and server 403C receives broadcasted recovery request 410 as recovery request 410C. Each of servers 403A, 403B, and 403C may include instructions to implement the functionalities as described in relation computing device 100 of FIG. 1 or may include engines to implement the functionalities as described in relation to server 300 of FIG. 3.

Servers 403B and 403C each send a response to the broadcast recovery request. These responses are represented by arrows 420B and 4200, respectively. These responses are sent because servers 403B and 403C have determined that they carry the recovery agent that may service the recovery request sent by switch 402. In examples using DHCP, this response may be a DHCPOffer. Server 403A does not send a response because server 403A determines that it cannot service the recovery request of switch 402 (e.g., because it does not recognize an option identified in the DHCPDiscover message).

Switch 402 sends a unicast request to each of the responding server for an executable copy of its recovery agent. This is represented in FIG. 4 as 430B and 430C. In response to the request, server 403B sends an executable copy of its recovery agent with a validation measure, and server 403C sends an executable copy of its recovery agent with a validation measure. This is represented by arrows 440B and 440C.

In the example of FIG. 4, switch 402 receives the response from server 403B first, and the response from server 403C second. One-by-one, switch 402 determines if the recovery agent received from each responder is suitable. In some examples, the suitability determinations are made in the order that the responses are received. The discussion of validation engine 203 and security key 211 as described in reference to FIG. 2 and validation engine 302 and security key 317 as described in reference to FIG. 3 are applicable here.

Switch 402 may store a list of responding servers and the suitability determination of each of the server's recovery agent. The discussion of record engine 306 of switch 300 is applicable here. Switch 402 first determines the suitability of recovery agent sent by server 403B. Using the validation measure included with the executable copy of the recovery agent sent by server 403B and the security key stored in switch 402, switch 402 determines that the recovery agent sent by server 403B is suitable. It stores server 403B having an uncorrupted executable copy of a recovery agent. Switch 402 does not stop after this determination. It then determines the suitability of the recovery agent sent by server 403C as being unsuitable. It stores server 403C as having a corrupted executable copy of a recovery agent and deletes the executable copy of the recovery agent sent by server 403C.

Switch 402 then executes the executable copy of the recovery agent sent by server 403B and sends a second request to server 403B. The second request is represented in FIG. 4 by arrow 450. It is noted that switch 402 sends the second request to server 403B and not servers 403A and 403C. The second request may include a request for a recovery plan.

In response to the second request, server 403B determines a recovery plan and sends the recovery plan to switch 402. This is represented by arrow 460 in FIG. 4. The discussion of recovery plan engine 334 of server 330 and instructions 116 of computing device 100 is applicable here. In some examples, switch 402 does not send the second request. In those examples, server 403B determines a recovery plan in response to the establishment of an encrypted connection between itself and switch 402.

In example of FIG. 4, switch 402 determines that server 403B has a suitable recovery agent while server 403C has an unsuitable recovery agent.

However, in other examples, switch 402 may determine that both servers have suitable recovery agents (e.g., when the validation measure included with the executable copy of the recovery agent sent by server 403B and the validation measure included with the executable copy of the recovery agent sent by server 403C are both validated by switch). In these examples (where there is more than one responder with a valid validation measure), switch 402 may determine which recovery agent to execute (i.e. which responder is the appropriate responder) based on a status identification of the recovery agent. In some examples, the status identification may be the version number of the recovery agent. For example, if the recovery agent sent by server 403B is an earlier version and the recovery agent sent by server 403C is a later version, switch 402 may execute the recovery agent sent by server 403C. Thus, in some examples, the executable copies of the recovery agent sent by servers 403C and 403B also include a status identification of the recovery agent and determining the suitability of the recovery agent is based, at least in part, on the status identification.

Although specific functionalities of computing device 100 and server 330 have been described as being included in servers 403A, 403B, and 403C, servers 403A, 403B, and 403C may include additional functionalities described in relation to computing device 100 and server 330. Although specific functionalities of computing device 200 and switch 300 have been described as being included in switch 401, switch 401 may include additional functionalities described in relation to computing device 200 and switch 300.

Figure 5:
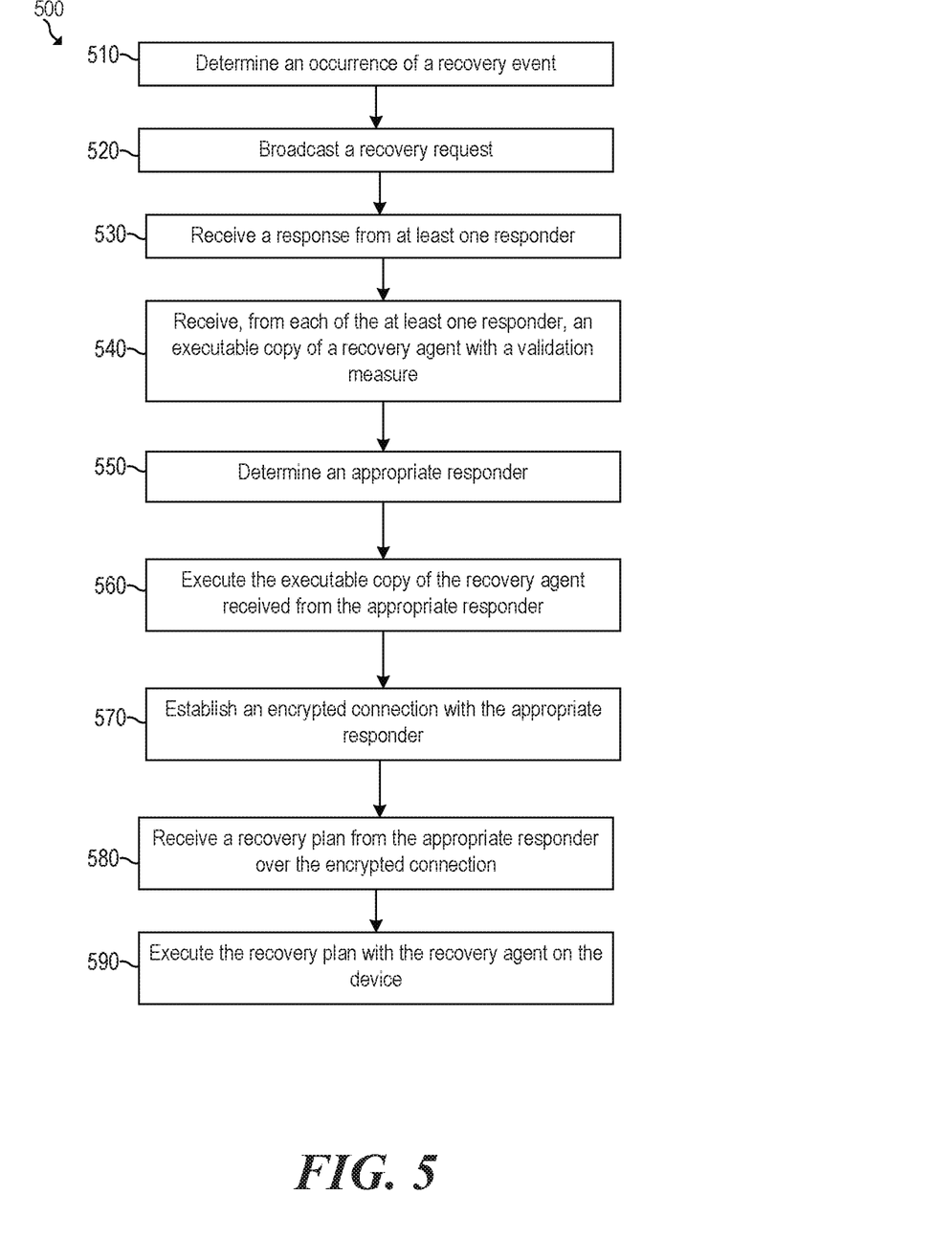
FIG. 5 is a flowchart of a method of broadcasting a recovery request and receiving a recovery plan from a responder, according to some examples.

FIG. 5 illustrates a flowchart for a method 500 to recover a computing device to a safe state. Although execution of method 500 is described below with reference to switch 300 of FIG. 3, other suitable devices for execution of method 500 can be utilized (e.g. computing device 200 of FIG. 2 or switch 401 of FIG. 4). Additionally, implementation of method 500 is not limited to such examples and it is appreciated that method 500 can be used for any suitable device or system described herein or otherwise.

At 510 of method 500, trigger engine 303 determines an occurrence of a recovery event on switch 300. At 520 of method 500, first communication engine 301 broadcasts a recovery request over network 320. As described above, the recovery request may include data that identifies switch 300. At 530, first communication engine 301 receives a response from at least one responder over the network 320. At 540, first communication engine 301 receives from each of the at least one responder, an executable copy of a recovery agent with a validation measure. At 550 of method 500, validation engine 304 may determine an appropriate responder. At 560 of method 500, execution engine 305 may execute the executable copy of the recovery agent received from the appropriate responder. At 570, second communication engine 302 establishes an encrypted connection with the appropriate responder. At 580, second communication engine 302 receives a recovery plan from the appropriate responder over the encrypted connection. At 590, the recovery plan received from the appropriate responder is executed by the recovery agent that is now running on switch 300.

Although the flowchart of FIG. 5 shows a specific order of performance of certain functionalities, method 500 is not limited to that order. For example, some of the functionalities shown in succession in the flowchart may be performed in a different order, may be executed concurrently or with partial concurrence, or a combination thereof. In some examples, 550 of determining an appropriate responder may be started before 540 of receiving from each responder an executable copy of a recovery agent is completed.

FIG. 6 illustrates a flowchart for a method 600 to recover a recovering device to a safe state with multiple responders. Although execution of method 600 is described below with reference to switch 300 of FIG. 3, other suitable devices for execution of method 600 can be utilized (e.g. computing device 200 of FIG. 2 or switch 401 of FIG. 4). Additionally, implementation of method 600 is not limited to such examples and it is appreciated that method 600 can be used for any suitable device or system described herein or otherwise.

At 610 of method 600, trigger engine 300 determines an occurrence of a recovery event. This determination may be performed as described above in relation to step 510 of method 500. At 620, first communication engine 301 may broadcast a recovery request using DHCP with a broadcast of a DHCPDiscover message over network 320. The discussion above in relation to DHCP is applicable here. At 630, first communication engine 301 may receive a DHCPOffer from at least one responder in network 320. At 640, first communication engine 301 may receive, from each of the at least one responder, an executable copy of a recovery agent with a validation measure. This may be performed as described above in relation to step 540 of method 500. At 651, validation engine 304 may evaluate the validation measure received with each executable copy of a recovery agent using security key 317 stored in memory 307. As discussed above, in some examples, the validation measure may be an encrypted hash and the security key 317 may be a public key. At 652, validation engine 304 determines if there is a responder that sent an executable copy of a recovery agent with a valid validation measure. If there is no such responder, method 600 reiterates back to 620, where first communication engine 301 broadcasts a recovery request over network 320. In some examples, first communication engine 301 may wait for a specific amount of time after 652 before re-broadcasting the recovery request (e.g., ten minutes, five minutes, two minutes, etc.). In some examples, the wait time may take into account the network usage, the protocol used, etc.

If there is a responder that sent a valid validation measure, method 600 proceeds to 653. At 653 of method 600, validation engine 304 determines if there is more than one responder that sent an executable copy of a recovery agent with a valid validation measure. If there isn't, validation engine 304 initiates execution engine 305. At step 660, execution engine 305 executes the executable copy of the recovery agent from the responder with the valid validation measure. This responder that sent the executable copy of the recovery agent with a valid validation measure may characterized as the appropriate responder.

If at 653, validation engine 304 determines that there is more than one responder that sent an executable copy of a recovery agent with a valid validation measure, method 600 goes to 654. At 654, validation engine 304 determines, from all the responders that sent an executable copy of a recovery agent with a valid validation measure, which responder sent the recovery agent that is the most recent version. This may be characterized as the appropriate responder. Validation engine 304 initiates execution engine 305 to execute the executable copy of the recovery agent from the appropriate responder. At 660, execution engine 305 executes the executable copy of the recovery agent from this responder. Thus, if the method went through 654 to 660, the appropriate responder is one that sent an executable copy of a recovery agent with a valid validation measure and is the one with the most recent version of the recovery agent.

At 670, second communication engine 302 establishes an encrypted connection with the appropriate responder. This may be performed as described above in relation to 570 of method 500. At 681, the recovery agent that was executed by execution engine 305 generates a data set that represents a filesystem of switch 300. At 682, second communication engine 302 sends the data set generated at 681 to the appropriate responder. 681 and 682 allows the appropriate responder to obtain forensic data of the operating environment of switch 300 before switch 300 is recovered to a safe state, thus allowing later analysis of switch 300. For example, if switch 300 is infected by malware, 682 and 683 may provide insight as the mechanism of attack.

Figure 7:
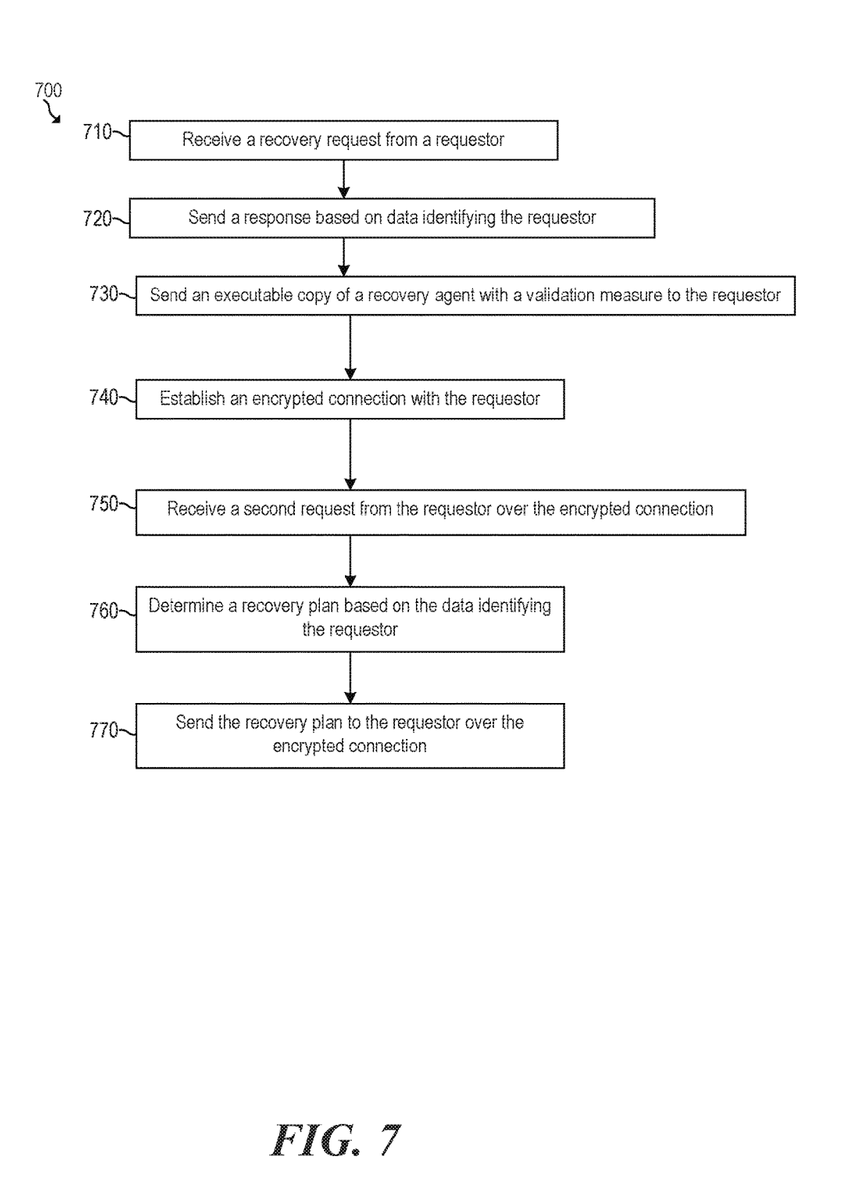
FIG. 7 is a flowchart of an example method to send an executable copy of a recovery agent and a recovery plan to a requester.

FIG. 7 illustrates a flowchart for a method 700 to send a recovery agent and a recovery plan to a recovering device. Although execution of method 700 is described below with reference to computing device 100 of FIG. 1, other suitable devices for execution of method 700 can be utilized (e.g. server 330 of FIG. 3 or one of servers 403B and 403C of FIG. 4). Additionally, implementation of method 700 is not limited to such examples and it is appreciated that method 700 can be used for any suitable device or system described herein or otherwise.

At 710, processing resource 101 may execute instructions 111 to receive a recovery request from a requestor 130 over network 120. As described above, the recovery request may use DHCP. At 720, processing resource 101 may execute instructions 112 to send a response to the requester. The response may be based on information contained in the recovery request that identifies the requester to computing device 100. At 730, processing resource 101 may execute instructions 113 to send an executable copy of a recovery agent with a validation measure to the requestor. In some examples, instructions 113 may include the functionalities discussed in relation to recovery agent engine 333 in determining which recovery agent to use.

At 740, processing resource 101 may execute instructions 114 to establish an encrypted connection with requester 130. At 750, processing resource 101 may execute instructions 115 to receive a second request from the requestor over the encrypted connection. As discussed above in relation to FIG. 1, in some examples, a second request is not received. At 760, processing resource 101 may execute instructions 116 to determine a recovery plan for the requestor. This may be done in response to the receiving of the second request or may be done in response to the establishment of the encrypted connection. As discussed above in relation to instructions 116, the recovery plan determination may be based, at least in part, on the data identifying the requestor received in the recovery request at 710. At 770, processing resource 101 may execute instructions 117 to second the recovery plan determined at 760 to the requestor using the encrypted connection established at 750.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions executable by a processing resource to:
   receive a recovery request over a network from a requestor, the recovery request data identifying the requestor;
   send a response to the requestor over the network, the response based on the data identifying the requestor;
   send an executable copy of a recovery agent with a validation measure to the requestor, wherein the executable copy of the recovery agent received by the requestor includes a status identification of the recovery agent;
   determine a suitability of the recovery agent based on a security key and a validation measure, wherein the suitability determination of the recovery agent is based on the status identification of the recovery agent;
   establish an encrypted connection with the requestor;
   receive a second request from the requestor over the encrypted connection;
   in response to the second request, determine a recovery plan based on the data identifying the requestor, the recovery plan including a command executable by the recovery agent; and
   send the recovery plan to the requestor over the encrypted connection,
   wherein the recovery plan is to be implemented on devices in the network with the recovery agent.

2. The storage medium of claim 1, wherein the encrypted connection is based on a transport layer security protocol.

3. The storage medium of claim 1, wherein the recovery request is based on a dynamic host configuration protocol.

4. The storage medium of claim 1, including instructions to receive a recovery plan response from the requestor over the encrypted connection;
   instructions to determine a second recovery plan based on the recovery plan response,
   wherein the second recovery plan comprises a subsequent command executable by the recovery agent; and
   instructions to send the second recovery plan to the requestor over the encrypted connection.

5. The storage medium of claim 1, wherein the recovery plan includes configuration data associated with the requestor.

6. The storage medium of claim 1, wherein the command executable by the recovery agent is to update a key stored in the requestor.

7. The storage medium of claim 1, comprising:
   instructions to monitor the requestor;
   instructions to determine an occurrence of a recovery event on the requestor; and
   instructions to initiate the requestor to send the recovery request.

8. The storage medium of claim 1, wherein the validation measure is an encrypted file signature for the executable copy of the recovery agent.

9. A computing device comprising:
   a memory to store a security key and identity data of the computing device;
   a first communication engine to:
      broadcast a recovery request over a network;
      receive a response from a responder in the network, wherein the recovery request includes the identity data of the computing device; and
      receive an executable copy of a recovery agent with a validation measure from the responder, wherein the executable copy of the recovery agent received from the responder includes a status identification of the recovery agent;
   a validation engine to determine a suitability of the recovery agent based on the security key and the validation measure, wherein the suitability determination of the recovery agent is based on the status identification of the recovery agent;
   an execution engine to execute the executable copy of the recovery agent; and
   a second communication engine to:
      establish an encrypted connection with the responder and to receive a recovery plan from the responder over the encrypted connection, wherein the recovery plan is to be implemented on devices in the network with the recovery agent.

10. The computing device of claim 9, comprising a trigger engine to determine an occurrence of a recovery event, wherein the broadcast of the recovery request is based on the determination of the occurrence of a recovery event.

11. The computing device of claim 9, comprising a record engine to store the suitability determination of the recovery agent.

12. The computing device of claim 9, wherein the execution engine is to execute the executable copy of the recovery agent based on the determination of the suitability of the recovery agent.

13. The computing device of claim 9, wherein the recovery plan comprises a command for altering an initial loader of the computing device and is executable by the executable copy of the recovery agent.

14. A method comprising:
   determining an occurrence of a recovery event on a device;
   broadcasting a recovery request over a network, wherein the recovery request comprises data identifying the device;

receiving a response from at least one responder in the network;

receiving, from each of the at least one responder, an executable copy of a recovery agent with a validation measure, wherein the executable copy of the recovery agent received from the responder includes a status identification of the recovery agent;

determining an appropriate responder by determining a suitability of the recovery agent based on a security key and the validation measure, wherein the suitability determination of the recovery agent is based on the status identification of the recovery agent;

executing the executable copy of the recovery agent from the appropriate responder;

establishing an encrypted connection with the appropriate responder;

receiving a recovery plan from the appropriate responder over the encrypted connection; and executing the recovery plan with the recovery agent on devices in the network with the recovery agent.

15. The method of claim 14, comprising:

the recovery agent generating a data set representing the filesystem of the device; and the recovery agent sending the data set to the responder over the encrypted connection.

16. The method of claim 14, wherein the at least one responder comprises at least two responders.

17. The method of claim 14, wherein the validation measure comprises an encrypted file signature; and wherein determining an appropriate responder comprises decoding the encrypted file signature with a public key stored on the device.

* * * * *